United States Patent [19]

Ichikawa

[11] 4,033,591
[45] July 5, 1977

[54] PICK-UP ARM ROTARY PIVOT BEARING STRUCTURE

[75] Inventor: Yoshitomo Ichikawa, Tokyo, Japan

[73] Assignee: Ichikawa Hoseki Kabushiki Kaisha, Tokyo, Japan

[22] Filed: Jan. 28, 1976

[21] Appl. No.: 653,200

[30] Foreign Application Priority Data

Jan. 31, 1975 Japan .................. 50-15157[U]

[52] U.S. Cl. .............................................. 274/23 R
[51] Int. Cl.² .......................................... G11B 3/10
[58] Field of Search .................................. 274/23 R

[56] References Cited
UNITED STATES PATENTS

| | | | |
|---|---|---|---|
| 3,378,267 | 4/1968 | Davis | 274/23 R |
| 3,682,485 | 8/1972 | Guha | 274/23 R |

FOREIGN PATENTS OR APPLICATIONS 968,833  9/1964  United Kingdom ............. 274/23 R Primary Examiner—Steven L. Stephan
Attorney, Agent, or Firm—George B. Oujevolk

[57] ABSTRACT

A pick-up arm rotary pivot bearing structure is disclosed, which comprises a cylindrical base rigidly provided in the upper portion with a crosswisely extending support beam, an upstanding pivot shaft centrally secured on the support beam, a pair of upper and lower cylinders coupled with each other by stems extending astride of the support beam and having an upper and a lower bearing element secured centrally thereof to be positioned opposedly to the both extremities of the pivot shaft, and a bracket having an arm-pipe and a balance weight mounted thereon and linked relative with upper cylinder.

1 Claim, 4 Drawing Figures a# PICK-UP ARM ROTARY PIVOT BEARING STRUCTURE

DETAILED DESCRIPTION OF THE INVENTION

1. Background of the Invention

This invention relates to a rotary pivot bearing structure of a pick-up arm ussed in a sound reproducing disc player.

2. Description of the Prior Art

It is well known that fidelity of reproduction by a disc player is greatly dependent on the properties of a pick-up cartridge among the other reproduction system of the disc recording, but sensibility of a pick-up arm carrying such a pick-up cartridge to cause same to responsively follow a sound groove in a disc is comparably critical to the fidelity of sound reproduction.

A one-point support system, as shown in FIG. 1, has been known as theoretically most sensitive in the horizontal rotary direction, which depends on rotary pivot bearing structure and its correctness. This support has, however, the general disadvantage that it is susceptible to unbalancing in the lateral directions, so that a fine adjustment device for a horizontal balance is required to involve a burdensome adjustment of horizontal balance everytime of replacing a cartridge or adjusting a stylus pressure. Specifically, this type of bearing structure tends to be influenced by warp of a recording disc and external oscillation in the course of following the sound groove; a silicone oil breaker a is incorporated for stable horizontal support, but incorporation of such a breaker may cause the problem of oil leakage so as to render the pick-up bearing structure inconvenient for handling. Incorporation of such a breaker is therefore not prevailed in general.

3. Object of the Invention

The object of the invention is, accordingly, to provide a pick-up arm rotary pivot bearing structure having a good sensibility and capable of obtaining a high-fidelity reproduced sound.

BRIEF DESCRIPTION OF THE INVENTION

DETAILED DESCRIPTION OF PREFERRED EMBODIMENTS

Figure 2:
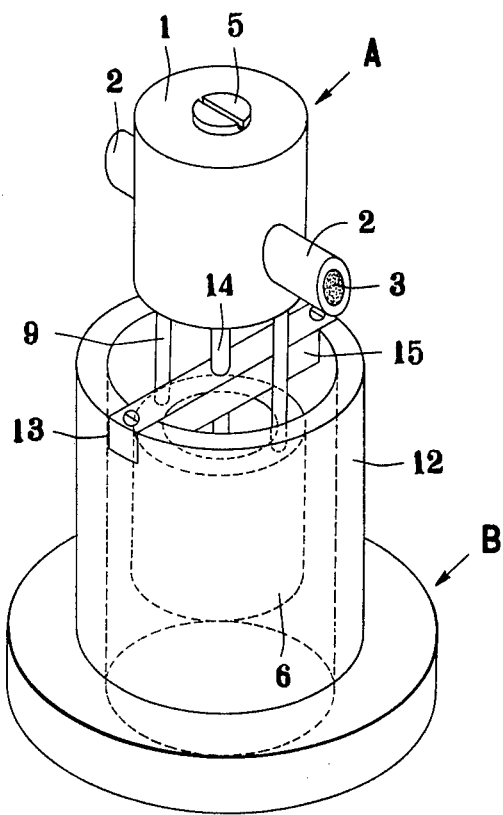
FIG. 2 shows a perspective view of one embodiment of the invention with a bracket removed.
Figure 3:
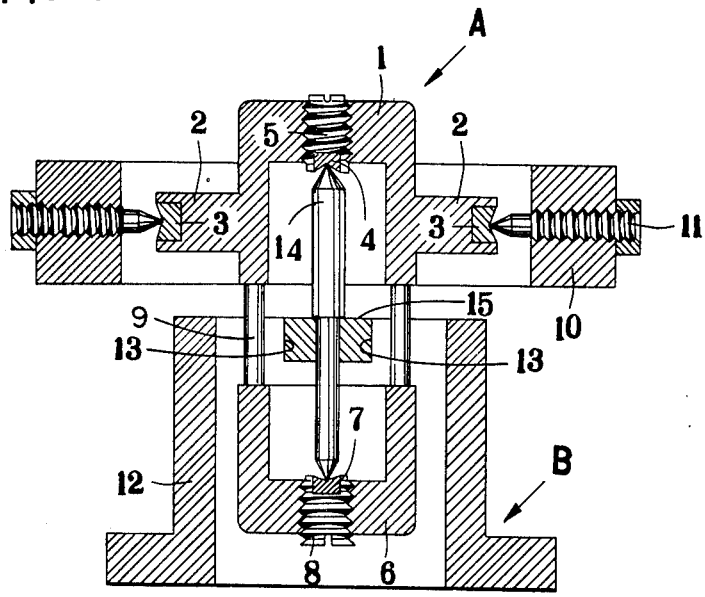
FIG. 3 shows a longitudinal section of one embodiment of FIG. 2.

Referring to FIGS. 2 and 3, a bearing structure according to the invention has an upper bottomed cylinder 1 of a determined diameter provided with a pair of arms 2,2 on the outer periphery to extend in an opposed radial direction to each other, a jewel bearing 3,3 disposed central of a distal end surface of the respective arms 2,2 and an upper bearing element 5 having a jewel bearing 4 secured on the underside and threaded in an upper bottom wall of cylinder 1. A lower bottomed cylinder 6 is provided threadedly in a lower bottom wall with a lower bearing element 8 having a jewel bearing 7 secured on the upperside. The upper and the lower bottomed cylinders 1 and 6 are spaced coupled through two stems 9,9 extending symmetrically of the axis thereof, to provide a rotor member A.

Figure 1:
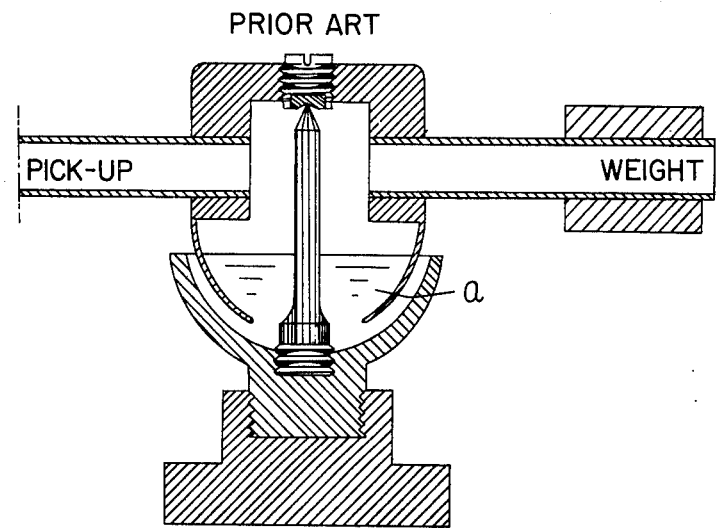
FIG. 1 shows a longitudinal section of a conventional pick-up arm rotary pivot bearing structure.

A bracket 10 is positioned arouund the periphery of the upper bottomed cylinder 1 and has a pair of bearing supports 11,11 in an inner radial direction opposed to jewel bearings 3,3 of the arms 2,2. The cartridge mounting arm pipe and a balance weight both of which are shown in FIG. 1, are mounted on the bracket 10.

A cylindrical base 12 has a greater inner diameter than an outer diameter of the lower bottomed cylinder 6, cut-outs 13,13 formed in the upper wall and laterally opposed to each other with the axis, and a support beam 15 fitted in the cut-outs 13,13 to extend across the diameter and having a length of upstanding pivot shaft 14 force-secured therein, so as to provide a stator member B.

The stems 9,9 of the rotor member A are extending astride of the support beam 15 of the stator member B, and the rotor member A is rotatably carried on the stator member B with the pivot shaft 14 having both ends rested on the bearing elements. Rotary angle of the member A is limited because of the stems 9,9 extending astride of the support beam 15, but in a range sufficient for that of a pick-up arm playing on a recording disc.

Figure 4:
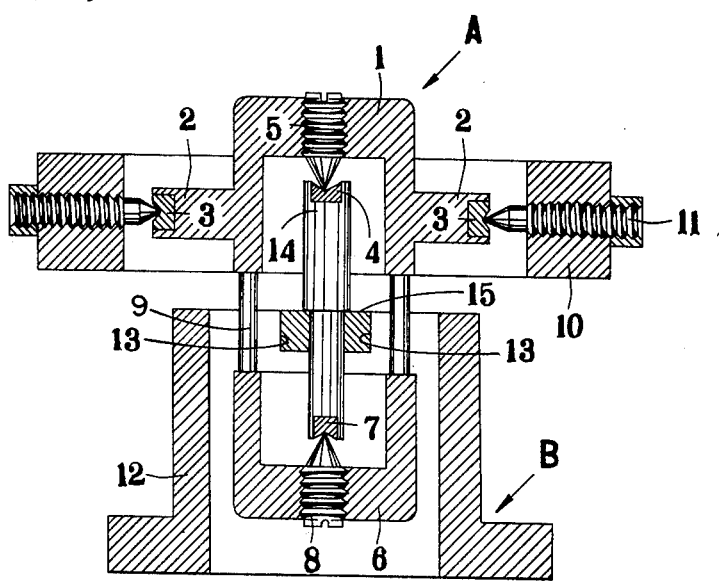
FIG. 4 shows a longitudinal section of another embodiment of the invention.

The jewel bearings 4 and 7 may be disposed on the opposed extremities of the pivot shaft 14, as in a modification shown in FIG. 4.

The rotor member A is rotatably supported on the opposed extremities of the pivot shaft 14 of the stator member B and a weight of a pick-up arm is supported on the upper extremity of of pivot shaft 14, thereby to provide not only a stabilized bilateral balancing system, but very light, highly sensitive operating characteristics without any breaking of a silicone oil as conventionally used nor any other friction involved. Further any burdensome fine adjustment of horizontal balancing is no more required. Oil leakage is naturally eliminated. Thus, the invention provides a pick-up arm rotary pivot bearing structure which is excellent in convenience of handling and transportation.

I claim:

1. A rotary pivot bearing structure for a pick-up arm comprising:
   a. a cylindrical base (12) with an upper portion;
   b. a crosswisely extending support beam (15) extending diagonally across said upper portion;
   c. an upstanding vertical pivot shaft (14) with upper and lower ends centrally secured on said support beam (15), end bearing means on said upper and lower ends;
   d. substantially identical upper and lower cup-like cylinders (1, 6) each cup-like cylinder having a cup disc end closed portion, an open front end, and a cylindrical wall, said open front end of each cup being disposed astride said support beam (15) facing the front end of the other cup, said cylindrical walls being coupled to each other by stems (9);
   e. upper and lower bearing elements (5, 8) threaded through the centers of said disc end portions opposed to the upper and lower ends of said vertical pivot shaft (14) and engaging the end bearing means on said upper and lower ends;
   f. a pair of opposed radial, substantially identical horizontally outward extending arms (2) coupled onto the outer periphery of the cylindrical wall of the upper cylinder, each arm having a distal end with a central portion, first and second bearing elements (3) disposed on each of said distal end central portions; and, g. bracket means (10) diagonally positioned around the periphery of the upper cylinder (1) and extending outward of said pair of arms (2), said bracket means (10) having inner threaded bearing supports (11) engaging said first and second bearing elements (3), said bracket means (10) serving to hold a cartridge mounting pick-up arm and a balance weight.

* * * * *